Nov. 16, 1926.  
J. G. PROSSER  
1,606,959  
METHOD AND APPARATUS FOR OBTAINING WORK IN INTERNAL COMBUSTION ENGINES  
Filed Nov. 30, 1921  2 Sheets-Sheet 2

Inventor.  
Joseph G. Prosser  
by Heard Smith & Tennant  
Attys.

Patented Nov. 16, 1926.

1,606,959

UNITED STATES PATENT OFFICE.

JOSEPH G. PROSSER, OF CHICAGO, ILLINOIS.

METHOD AND APPARATUS FOR OBTAINING WORK IN INTERNAL-COMBUSTION ENGINES.

Application filed November 30, 1921. Serial No. 518,942.

This invention relates to a means or apparatus and a process or method for obtaining work in an internal combustion engine.

The object of the invention is to secure in an internal combustion engine, except during the period when the engine is idling, that enough air in proportion to the amount of hydrocarbon shall be drawn into the cylinder thereby automatically to insure that the mixture shall not be over-rich in hydrocarbon.

The object of the invention is further definitely to control the amount of hydrocarbon supplied to the cylinder and to eliminate a throttle valve between the cylinder and the point where the main body of air is mixed with the hydrocarbon. The purpose is to secure a uniformly economical operation of the engine. It is practically impossible so to set a throttling carburetor as to give the most desirable mixture at all loads and speeds not to mention the complications encountered because of variations in barometric conditions and fuel quality. There are two main factors contributing to economy in the operation of the internal combustion engine namely compression and quality of the mixture. The term "quality" with reference to the mixture is here and in the claims used to indicate the relative proportion in the mixture of air and hydrocarbon or, in other words, the extent to which the mixture is "rich" or "lean" in hydrocarbon. Maximum explosive quality exists, then, only when the mixture is neither "rich" nor "lean." When maximum compression and maximum explosive quality are secured together the maximum power is developed for each explosion. Either compression or quality must, therefore, be sacrificed if anything less than the maximum power is obtained. With the throttling carburetor compression is sacrificed, while with a device embodying this invention quality is sacrificed. But as an explosion of a charge of somewhat less than maximum density and of maximum explosive quality may produce more power if enough air be added to the charge to bring it up to maximum density it follows that a device of this invention wherein this action takes place involves the principle of making air take the place in the charge of a certain amount of hydrocarbon. The method of this invention therefore operates on more economical principles and enables the best regulation under given conditions to be secured automatically in place of laborious, arbitrary manual adjustments.

The object of the invention is further to provide means for adjusting the hydrocarbon valve to vary the amount of hydrocarbon supplied for idling and without changing this adjustment to provide means for the setting of the hydrocarbon valve for heavier loads.

The object of the invention is further to provide a quantitative control of the mixture for idling by adjusting the hydrocarbon valve to provide a required rich mixture and limiting the amount of said mixture that may be drawn into the cylinder.

The object of the invention is further to provide means for enabling the engine itself to control by its speed the quality of the mixture admitted and thus to simplify the adjustments required and enable the apparatus to be self compensatory for variations at ordinary altitudes in barometric conditions and normal variations in volatility and other characteristics of the hydrocarbon.

The object of the invention is further to provide means for changing gradually from the idling load to the heavier loads without increasing the density of the mixture too rapidly so that in overcoming the lighter loads the quality of mixture supplied shall not be too lean.

The object of the invention is further to increase the density of the mixture over that required with the quantitative control as when a throttle is used to regulate the amount of the charge. Thus the compression is increased and it becomes practical to use the less volatile hydrocarbon liquids.

The objects of the invention is further to provide in an internal combustion engine, means for regulating the power developed by controlling the quality of the mixture admitted to the cylinder, means for regulating the power developed by controlling the quantity of the mixture admitted to the cylinder, together with means for rendering either of said regulating means effective.

The object of the invention is further to supply and carry to the cylinder a uniform amount of hydrocarbon for any given adjustment of the means for adjusting the supply of hydrocarbon regardless of the physical characteristics of the manifold or the pressure therein thus enabling uniform operation and control to be secured independently of the volatility of the fuel.

The invention in some of its aspects is disclosed in my Patent No. 1,417,859, granted May 30, 1922, and this application in so far as the subject matter thereof is disclosed in said patent is to be considered as a continuation of the application for said patent.

The hereinbefore recited and other objects and features of the invention will appear more fully from the accompanying description and drawings and will be particularly pointed out in the claims.

The drawings show a simple and preferred form of apparatus as adaptable to the ordinary automobile engine and involving the invention.

As the invention is not concerned with the details of the internal combustion engine it is sufficient to illustrate the engine in a general way. A portion of an ordinary type of automobile internal combustion engine is shown including the cylinder block 1 formed to present the cylinder 2, valve chamber 3, valve 4 and the piston 5 reciprocable in cylinder 2 and transmitting power through the piston rod 6 in the usual manner.

An ordinary type of manifold 7 is shown flanged at its ends and secured by bolts 8 to the engine block. This manifold should preferably be of symmetrical shape with respect to the central vertical axis, and it is herein shown as square in cross section, thus more readily to enable the parts hereinafter described to be connected to it.

The hydrocarbon is supplied through a pipe 9 to a float chamber 10 open to atmospheric pressure. This float chamber is preferably in the form of an annulus extending between the outer cylindrical casing 11 and a large inner central standard 12. The cylindrical casing 11 of the float chamber casing is carried around to form the bottom of the float chamber and by a driving fit or otherwise is suitably secured to the bottom of the standard 12. The top of the float chamber is covered by a cap 13 threaded onto the cylindrical casing 11. A vertical hollow post 14 is threaded at 15 into the top of the standard 12 and projects up through the cap 13. A float 16 shown as a hollow metal annulus is located in the float chamber and secured to a sleeve 17 freely sliding on the exterior of the standard 12 and guided in its vertical movement by a pin 18 projecting from the standard into a vertical groove 19 in the sleeve. The sleeve is suitably connected to a valve in the hydrocarbon inlet 9 so as to maintain a fixed level of hydrocarbon in the float chamber. In the construction illustrated a bell crank lever 20 is pivoted at 21 on the end of the inlet pipe 22 threaded into the casing 11. This bell crank 20 loosely engages at its inner end a lug 23 on the sleeve 17. The valve 24 has its spindle 25 pivoted at the angle of the bell crank. Hence as hydrocarbon is withdrawn from the float chamber and the float drops the valve 24 is opened and remains opened until the float rises to the predetermined position.

The hydrocarbon passes from the float chamber through a passageway 26 in the standard 12 to a central vertical cylindrical nozzle 27 herein shown as a small sleeve driven into the centre of the standard and projecting up into the hollow post 14.

The opening for the egress of the hydrocarbon from the nozzle 27 is controlled by a needle valve shown as a tapered pin 28 on the lower end of a rod 29 extending up through the hollow post, guided in the upper end of the post and adjustably connected, as by threaded engagement, to a head 30 pivoted to an operating link 31. Air sufficient to form with the hydrocarbon a rich mixture is admitted around and below the mouth of the nozzle 27. For this purpose an annular chamber 32 is conveniently formed in the standard 12 around the nozzle 27 and beneath the lower end of the post 14. From this chamber 32 the air passes around the nozzle 27 in an annular space in the post 14 surrounding the rod 29 which rod may be preferably of the same external diameter as that of the sleeve forming the nozzle 27. Air is admitted to the chamber 32 in any suitable manner as through a pipe 33 extending from the chamber down through the standard 12 and in the form shown bent back into a vertical position and carrying at its upper end a priming cup 34 threaded thereto at 35. The priming cup may be utilized for applying a priming charge as in the case of cold weather or when a relatively non-volatile or low gravity hydrocarbon is being used. The required vacuum at the fuel nozzle is secured in the form illustrated by a valve in the pipe 35. This is shown as a ball 36 seating against the opening 37 into the priming cup and held in position by a light spring 38. This spring is shown located abutting the threaded end of the pipe 35 so that by screwing the priming cup up and down on the pipe the tension exerted by the spring, and consequently the degree of vaccum produced, may be varied.

The rich mixture thus formed by the hydrocarbon passing from the nozzle 27 and the air passing up around the nozzle is transmitted from the hollow post 14 to the manifold. The post 14 is preferably located as shown centrally of the manifold and symmetrically arranged pipes 39 extend therefrom into the manifold and preferably to positions adjacent the openings into the cylinder. While these pipes are herein shown as two in number they will be of such a number or so arranged as to subdivide the mixture formed in the hollow post 14 and present it in equal amounts to the individual cylinders of the engine. In the construction illustrated the pipes 39 project into the manifold near the cylinder openings and at their ends flare outward as shown at 40 and are covered with wire gauze 41 to assist in the atomization of the mixture. These pipes thus lead into proximity to the cylinder and carry the hydrocarbon into proximity to the cylinder by which it is meant that these pipes terminate at points in sufficient proximity to the cylinder inlet to prevent deposition of hydrocarbon before the mixture is drawn into the cylinder.

The admission of a separate body of air to the cylinders is provided for by a valve construction herein shown as including a vertically arranged cylindrical casing 42. This casing is formed at the rear with a flange 43 by which it is bolted directly to the front face of the manifold. For convenience of arrangement in the construction illustrated this casing is set slightly to one side but the passageway 44 therefrom into the manifold is arranged to enter at the center of the manifold so that the air is symmetrically distributed in the manifold.

The casing 42 is provided at the lower end with a valve opening 45 over which is seated a valve 46, the spindle 47 of which projects downwardly through a bracket 48 and is surrounded by a helical spring 49 abutting between the bracket 48 and nuts 50 adjustable on the lower end of the spindle. The adjustment, therefore, of the spring 49 by the nuts 50 in conjunction with the weight of the valve permits of any degree of vacuum being obtained in the cylinder, while the retarding influence due to the inertia of the valve allows, in addition, the hydrocarbon time in which to reach the cylinder and meet the additional charge of air.

The passageway 44 from the cylinder is opened and closed or its effective area varied by a valve shown in the form of a piston 51 sliding in the casing 42 and controlled by a rod 52 projecting up through the head 53 of the casing and pivoted to an operating link 54.

Figure 1:
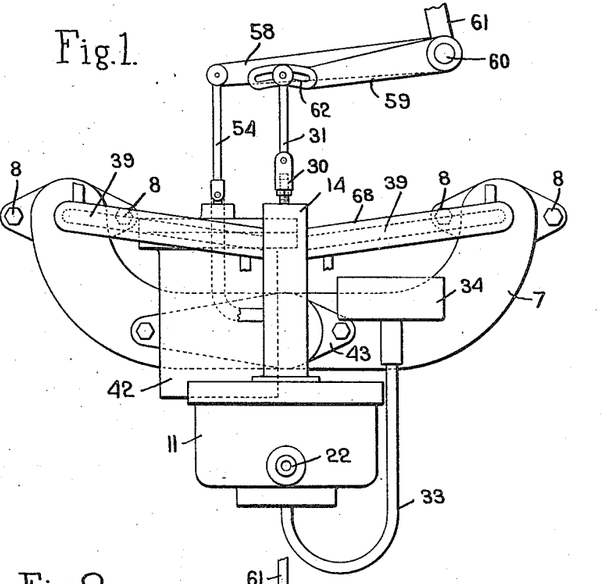
Fig. 1 is a front elevation of the manifold of an automobile engine together with a preferred form of apparatus embodying the invention.
Figure 2:
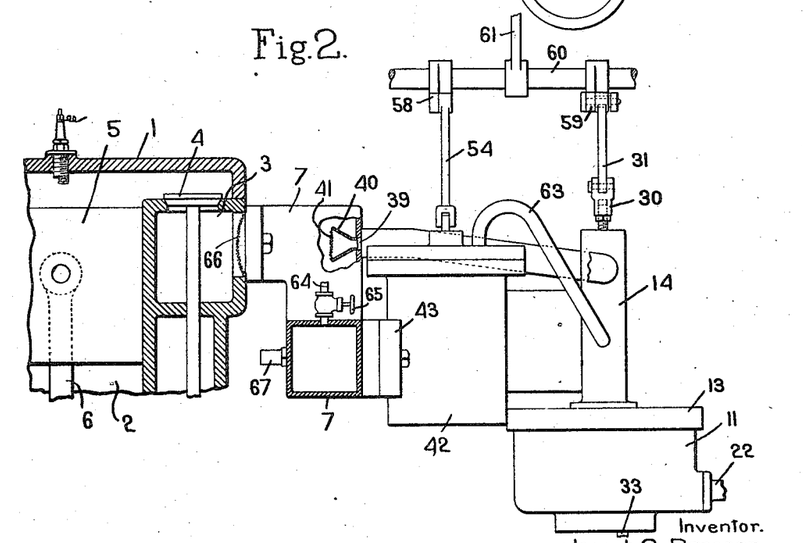
Fig. 2 is a side elevation partially in cross section of the construction shown in Fig. 1, together with a portion of an automobile engine.
Figures 3, 4:
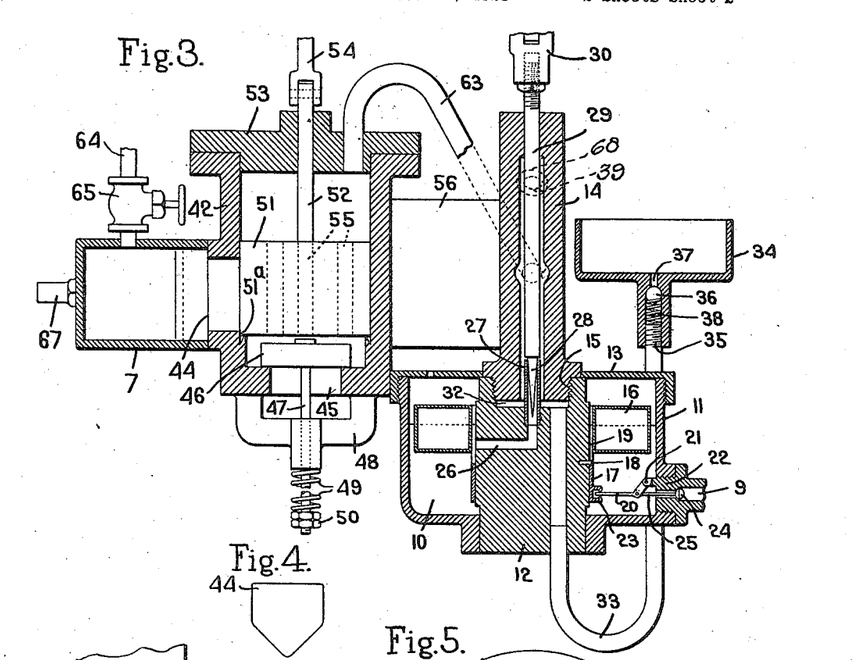
Fig. 3 is a view showing the main features of Fig. 1 in vertical cross section.
Fig. 4 shows a preferred shape of the orifice leading from the air cylinder.
Figure 5:
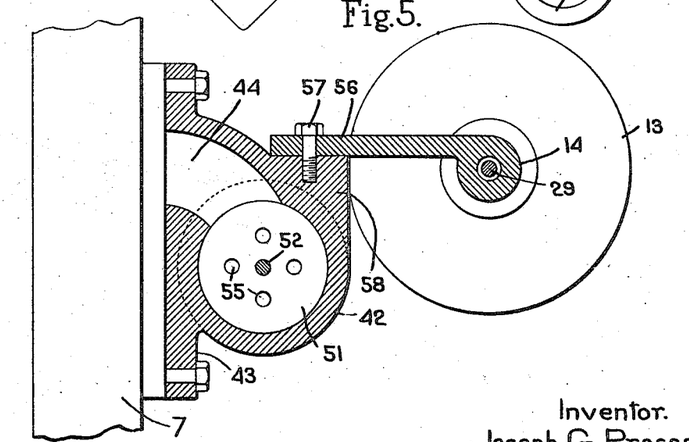
Fig. 5 is a top plan view partially in horizontal cross section of a portion of the construction shown in Fig. 1.

The valve 51 is balanced by openings 55 extending therethrough. The mouth of the passageway 44 at the inner wall of the cylindrical casing 42 where it is controlled by the valve or piston 51 is preferably shaped somewhat as shown in Fig. 4 to secure a more gradual admission of the air and consequently a more gradual increase in the density of the mixture.

When the piston 51 is moved toward its upper limit, opening the passageway 44 to the full area of opening 45, the valve 46 must lift from its seat sufficiently to provide an area of opening equal to that of the passageway. Consequently the spring 49 must be of such a length that its compression to full opening of the valve 46 will not substantially affect the degree of vacuum at which the valve 46 is set to operate.

The post 14 which supports the float chamber may be held in place as illustrated by means of a flange 56 projecting rearwardly therefrom and bolted at 57 to a projection 58 from the cylindrical casing 42.

The operating links 31 and 54 may be operated or adjusted by any suitable means to effect the control of the needle valve 28 and the piston valve 51. As shown these links 31 and 54 extend upwardly and are pivoted respectively to arms 58 and 59 extended from a shaft 60 and the shaft 60 is provided with an operating lever 61 which may be controlled manually, by a governor, or otherwise as desired. The air valve 51 is shown with a certain amount of lap at 51$^a$. This permits of changing the idling mixture upon variation in barometric conditions or fuel quality. An adjustment is provided to vary the relative movement of the needle valve and piston valve as required and for this purpose the operating link 31 at its upper pivoted end is mounted in an arc-shaped slot 62 formed in the end of the arm 59. The arc 62 in the arm 59 preferably has its center at the pivot 30 when the needle valve is in its lowermost open or idling position.

The interior of the air cylinder casing 42 is connected with the annular space surrounding the needle valve rod 29 in the post 14 above the nozzle 27 as by a pipe 63. The internal area of each pipe 39, of the annular space between the valve rod 29 and the post 14, of the pipe 33, and of the opening 37 should preferably be the same, and the internal area of the pipe 63 should be at least as large in order to meet the necessary requirements.

Preferably means are provided for admitting water vapor or steam to the mixture and as here shown a pipe 64 extends into the manifold controlled by a valve 65 and may be connected to any point preferably above the water level in the jacket of the engine.

A fine mesh wire screen 66 is shown at the opening from the manifold into the valve chamber and acts further to assist the atomization of the mixture and also to prevent the flame upon backfiring from igniting the mixture in the manifold. A relief valve 67 may also be provided in the manifold to relieve the pressure in the case of backfire.

The pipes 39 which transmit the rich mixture may each be heated as by a suitable water jacket 68. This enables the hydrocarbon to be heated to the desired temperature without heating the entire body of air.

With this description of a preferred and specific form of apparatus embodying the invention the broad principles involved will be understood from a description of the operations which take place in the operation of this apparatus.

In proportioning the apparatus to a given engine the effective area of the passageway through the hollow post 14 surrounding the needle valve rod 29 is made such as to limit the amount of mixture that can pass therethrough to that amount of mixture of fixed quality which is required for idling at the desired speed.

The pipe 33 as already pointed out must have an area sufficient to permit a supply of air therethrough past the hydrocarbon nozzle 27 unrestricted save by the area of the passageway through the post 14 already referred to. The area of the pipe 63 is fixed as already pointed out by the requirement that it shall be sufficient to determine the vacuum or pressure in the passageway through the post 14 below its connection therewith and thus prevent any greater suction being transmitted through the pipes 39 affecting the flow of the mixture below this point.

Thus the invention insures that when the engine is drawing a charge there shall be a substantially uniform flow of hydrocarbon through the passageway in the post 14 at any given setting of the needle valve. The term "flow" is here and in the claims used in the same sense as in hydraulics, or, as indicating the volume passing a point in a unit of time. This flow is determined by the area of the passageway and the pressure producing the flow. The pressure in turn is determined by that existing at the point where the pipe 63 enters the passageway and the pressure existing at the admission end of the pipe 33 subject, of course, to the friction losses occurring in the pipes. The pressure in the pipe 63 is controlled by the spring 49 which under ordinary circumstances should be adjusted to produce a small reduction below atmospheric pressure while the pressure in the pipe 33 is controlled by the spring 38 which should be adjusted to produce a still smaller reduction in atmospheric pressure. This insures that the hydrocarbon shall be sucked out through the nozzle 27 before the ball valve 36 opens and the flow of air commences. As soon as the valve 36 opens the air drawn through the pipe 33 surrounds the nozzle and carries the hydrocarbon to the cylinder. If at any time the suction produced by the engine tends to produce a pressure in the passageway through the post 14 further below atmospheric than that determined by the spring 49 then the valve 46 will be lifted and air will flow through the pipe 63 thus preventing the reduced pressure from extending down to the hydrocarbon nozzle. Thus when the engine is drawing a charge a uniform vacuum is maintained at the hydrocarbon nozzle under all conditions and speeds. In other words a constant flow of hydrocarbon for any given position of the needle valve 28 is secured.

The uniform flow of hydrocarbon at any predetermined setting of the hydrocarbon valve requires a corresponding uniform differential between, on the one hand, the pressure at the hydrocarbon inlet, the area of which is fixed by the setting of the valve, and, on the other hand, the pressure on the hydrocarbon supplied to this inlet, as in the float chamber. This differential may also be defined as the drop in pressure at the hydrocarbon inlet below the pressure on the hydrocarbon in the float chamber which is usually, as here illustrated, that of the atmosphere.

The pressure above the hydrocarbon inlet is determined by "the fluid inlet" as from the pipe 63 into the post 14. This determining pressure of the fluid inlet depends upon the tension of the spring 49 in the construction illustrated, which affords a simple and preferred means for this purpose. Thus the differential in pressures determining the flow of hydrocarbon from the hydrocarbon inlet is under perfect control.

It will be impossible to idle or operate at the lighter loads satisfactorily with a mixture of maximum density because the charge would be so lean that it would explode irregularly and each explosion would develop so much power that the engine would race. But with the increase of the load a point is soon reached where it is practical to admit a mixture of maximum density and get even running at the desired speed.

This invention enables the engine to idle satisfactorily at any desired speed by providing means whereby an explosive mixture of controlled density is admitted to the cylinder. Any increase in power is secured and maintained by admitting an increased amount of hydrocarbon which remains uniform after such increase and at the same time an increased amount of air widely varying as to quantity. The piston speed controls the amount of air within the limits possible through that portion of the opening 44 uncovered by the valve 51 and the position of the hydrocarbon valve 28 controls the amount of hydrocarbon. The initial charge drawn into the cylinder after such a readjustment of the position of the hydrocarbon valve for increase in power will be more dense and contain more hydrocarbon. But the proportions or the quality may be very different than those of the idling mixture. It is only necessary to insure that the air opening uncovered by the piston air valve 51 should not be so great as to give a mixture too lean to explode. The first explosion of this denser charge containing more hydrocarbon will increase the piston velocity which, in turn, will reduce the pressure in the manifold so that the next charge drawn into the cylinder will be less dense although containing a greater proportion of air than the first charge because the fall in pressure in the manifold induces a more rapid flow of air through the air valve opening while the flow of hydrocarbon remains constant. In other words the cylinder volume uncovered by the piston has to be filled in less time through the same sized air opening while there is no increase in the amount of hydrocarbon admitted. This charge is, therefore, somewhat less dense and more lean and, therefore, weaker because of the change in quantity and quality. Should the force of the explosion of this charge, however, be great enough still further to accelerate the piston speed the next charge will for the same reasons be still less dense and still more lean. The engine will thus automatically reduce the amount of hydrocarbon and increase the amount of air used for each charge until there is only enough hydrocarbon in the charge to maintain the desired speed or overcome the desired resistance. Further opening of the hydrocarbon valve and of the air valve will act in the same manner first to increase the density of the mixture with or without changes in the proportion of air and hydrocarbon. The piston speed will then work to reduce the density and the amount of hydrocarbon used in each charge until the explosive force and the resistance to the piston are again balanced. Under these conditions it is impossible to operate with a mixture having too much hydrocarbon. The initial charge after adjustment might be rich but the following explosions would be more and more violent until a perfect mixture was secured after which the force of the explosions would taper down again until the minimum amount of hydrocarbon was used for the final density reached. If now an increased resistance is offered to the movement of the piston the speed will be reduced and the mixture will become more dense because there is more time within which to fill the cylinder with air through the same air valve opening and there will also be more hydrocarbon in the charge because the flow is maintained uniform. Hence the resulting explosion will be more powerful and each reduction in piston speed will be followed by a more powerful explosion until maximum density of mixture is reached and the piston speed is such that the constant amount of hydrocarbon supplied is just sufficient when mixed wth the air at maximum density to give the most powerful mixture. If the piston speed decreases further the mixture becomes too rich and less powerful and, therefore, the engine must die down from the overload for the existing adjustment which is what must happen in any overloaded engine.

The shape of the air opening uncovered by the piston valve 51 will determine how quickly that maximum density of the mixture may be attained which will give an explosive mixture requisite for the control of the speed with the load at the time. This is purely selective, but for maximum economy or for utilizing kerosene or such low grade fuels it is desirable to reach maximum density of the mixture rapidly.

After a mixture of maximum density is admitted to the cylinder the control of the engine depends upon the proportion of hydrocarbon in the charge. Further opening of the air valve permits of no increase in density of the charge but the amount of hydrocarbon is increased each time the needle valve is raised so that the mixture becomes more powerful and, if the engine speeds up, becomes more lean but not less dense as before. Hence the needle valve can be raised until any desired resistance is overcome within the limits of the engine.

It is obvious that, if the air opening uncovered by the valve 51 is so shaped or the conditions are such that maximum density of the charge as determined by the spring 49 is not obtained until the piston valve is at the limit of its movement or is never obtained, still the foregoing advantages of the invention are obtained with a corresponding loss in power and efficiency.

Thus with this invention if the arbitrary mixture used for idling is correctly proportioned there cannot, except momentarily, be too rich a mixture. There is no throttle valve to check the flow of air and hydrocarbon at the same time and so prevent control either of the hydrocarbon or of the air.

Quantitative control is herein assumed to be the method of control when the resistance is overcome by a mixture, the proportions of which are approximately predetermined and the force of the explosion of which is, therefore, determined by regulating the density of the mixture that is admitted to the cylinder.

Qualitative control is herein assumed to be the method of control when the resistance is overcome by a mixture, the density of which is approximately predetermined and generally the maximum available under the conditions and the force of the explosion of which is, therefore, determined by regulating the proportion of hydrocarbon in the mixture that is admitted to the cylinder.

When, therefore, the resistance is overcome by a mixture the force of the explosion of which is not determined either by a predetermined density or predetermined proportions of the mixture the control is considered as both quantitative and qualitative.

In the construction illustrated it is, therefore, considered that the engine is controlled quantitatively when idling because it is necessary to use an attenuated mixture in order to limit the power developed regardless of the proportions of the mixture, qualitatively when the mixture is of maximum density and by a combination of quantitative and qualitative control at the intermediate loads.

If as already noted the full advantages of the invention are not desired and the shape of the air opening 44 is such or the conditions are such that the maximum density of the charge is not reached then even on the higher loads the control is both quantitative and qualitative as at the intermediate loads.

It is evident that, in order automatically to secure through the engine speed the most economical mixture of air and hydrocarbon for any given load in the manner herein described, one of the elements in the mixture must be maintained constant while the other element is varied. If varied within predetermined limits, such limits should include that quantity of one element which will give the most economical mixture with the constant amount of the other element at the final density, or the maximum speed at which the engine is to be run should secure a lean mixture at any setting during the period that quantitative and qualitative control are both in operation.

After any change in position of the hydrocarbon and air valves has been made, the engine will automatically vary through its speed the amount of air that is drawn through the air valve, and as the velocity of the air through this opening may be anywhere from nothing to 50,000 feet per minute, according to the difference in pressure outside and inside the manifold, there is almost an unlimited range in the quality of the mixture which may be secured for any given flow of hydrocarbon. The quality will be always maintained rich enough to secure regular explosions during the period of both quantitative and qualitative control upon any change in position of the hydrocarbon and air valves unless the density is increased too rapidly as when the area of the air opening is uncovered too rapidly with relation to the flow of hydrocarbon permitted by such change. Hence is provided the adjustment of the arc-shaped slot 62.

If the quantity of hydrocarbon is allowed to vary materially at any given setting of the hydrocarbon valve during quantitative and qualitative control then increased engine speed may maintain a constant quality, or even enrich the mixture, instead of reducing the proportion of hydrocarbon, and the economy of the invention is lost, as well as the feature of automatic adjustment. After the point has been passed where mixture of maximum density is admitted to the cylinder, then the ratio of air and hydrocarbon becomes the only variable.

When an engine is operating with a uniform density of mixture, and at a uniform speed, as when under regulation by a speed governor, no trouble is experienced with qualitative control of the mixture, even though the hydrocarbon valve should not exactly control, by position, the amount of hydrocarbon fed to the cylinder, because the governor can raise and lower the hydrocarbon valve without causing any change in the quantity of air, and therefore regulate the quality of the mixture by controlling the amount of hydrocarbon added. If, however, the density of the mixture is varied, as for the lighter loads, and the vacuum created by the piston motion extends back to the hydrocarbon valve, then, even though the engine run at uniform speed, an increased opening of the hydrocarbon valve may not be accompanied by an increased flow of hydrocarbon, if there is also, at the same time, an increased flow of air to the cylinder, as the lesser amount of vacuum due to constant speed with an additional supply of air may not draw more or even as much hydrocarbon from the valve, though it has the increased opening.

In order to set the device in the form illustrated it is only necessary to close the piston air valve 51 and lower the needle valve 28 by means of its threaded engagement with the head 30 until the mixture of air and hydrocarbon drawn through the pipes 39 gives the proper idling operation. The engine should then be run rapidly with a heavy load and the link 31 moved along the arc-shaped slot 62 until a mixture that is not too rich in hydrocarbon is obtained. The engine piston can only draw at maximum speed a certain volume of air of maximum density and if the needle valve 28 opens the hydrocarbon nozzle too much then an oversupply of hydrocarbon results so that without this adjustment it would be necessary to have a needle valve of perfect contour in order to insure against too rich a mixture. With these two points determined the piston speed will automatically take care of all intermediate loads and speeds.

It will of course be appreciated that, in an internal combustion engine even when as usual of the multicylinder type, the suction produced, and by which the charge is drawn in, is not strictly continuous but rather of a pulsatory character. The flow of hydrocarbon, and for that matter of air also, therefore takes place only during the charging period or when a cylinder is drawing in a charge and might even cease if these periods are discontinuous. But in this invention the flow of hydrocarbon from its source of supply or past the hydrocarbon valve is always constant for any given setting of the valve whenever the charging period occurs and so long as it lasts.

The phrase "uniform flow" is used in the claims as meaning a flow that will deliver equal amounts of hydrocarbon in equal periods of flow.

Having now described my invention what I claim as new and desire to secure by Letters Patent is:

1. The method of operating an internal combustion engine comprising a cylinder and a piston reciprocable therein which consists in adjusting the area for the air flow to the cylinder, in determining the amount of air supplied to the cylinder by the speed of the piston between successive adjustments, in maintaining a uniform amount of flow of hydrocarbon to the cylinder between such adjustments, and in varying the amount of flow of the hydrocarbon and the area for the air flow simultaneously.

2. The method of operating an internal combustion engine comprising a cylinder and a piston reciprocable therein which consists in adjusting the area for the air flow to the cylinder, in determining the amount of air supplied to the cylinder by the speed of the piston between successive adjustments, in maintaining a uniform amount of flow of hydrocarbon to the cylinder between such adjustments, in varying the amount of flow of the hydrocarbon and the area for the air flow simultaneously, and in reducing the amount of flow of the hydrocarbon and the area for the air supply simultaneously.

3. The method of operating an internal combustion engine comprising a cylinder and a piston reciprocable therein, and an air inlet which consists in adjusting the amount of the flow of hydrocarbon and the area of the air inlet simultaneously, in maintaining a uniform amount of flow of hydrocarbon to the cylinder between such adjustments, thereby causing the mixture to become leaner with each increase in the speed of the piston occurring between such adjustments.

4. The method of operating an internal combustion engine comprising a cylinder and a piston reciprocable therein which consists in overcoming the resistances due to a predetermined load with a mixture of hydrocarbon and air of appropriate quality, in overcoming the resistances due to a lighter load with a mixture of less density and of a quality determined by the speed of the piston, and in varying the amount of flow of the hydrocarbon and the area for the supply of air to the mixture simultaneously whereby the proportion of hydrocarbon in the mixture becomes less with increase in the speed of the piston at any area for the supply of air.

5. The method of operating an internal combustion engine comprising a cylinder and a piston reciprocable therein which consists in supplying to the cylinder a mixture of air and hydrocarbon of a selected density and of a quality sufficient to overcome the existing resistances, in then maintaining the amount of hydrocarbon in the mixture uniform until a change is made in the area for the flow of air to the mixture while increasing the proportion of air in the mixture upon any increase in the speed of the piston, and in increasing the amount of flow of hydrocarbon and the area for the air flow simultaneously.

6. The method of operating an internal combustion engine having a cylinder, a piston reciprocable therein and means for supplying air and hydrocarbon to said cylinder which comprises correlating the area for the supply of air and the amount of hydrocarbon flow to produce a mixture of greater explosive force than that required to overcome the existing resistance, maintaining the amount of hydrocarbon flow uniform during any increase in the supply of air caused by any increase in the piston speed produced by said mixture, thereby leaning the mixture, until a mixture of minimum explosive force that will overcome the resistance is attained and, upon a change in resistance, simultaneously adjusting the area for the supply of air and the amount of hydrocarbon flow to produce a mixture of different explosive force, again maintaining the amount of hydrocarbon flow uniform, whereby the piston speed determines the proportions of the mixture in accordance with the new resistance.

7. The method of operating an internal combustion engine having a cylinder, a piston reciprocable therein and means for supplying air and hydrocarbon to said cylinder which comprises correlating the area for the supply of air and the amount of hydrocarbon flow to produce a mixture of greater explosive force than that required to overcome the existing resistance, maintaining the amount of hydrocarbon flow uniform during any increase in the supply of air caused by any increase in the piston speed produced by said mixture, thereby leaning the mixture, until a mixture of minimum explosive force that will overcome the resistance is attained and, upon an increase in resistance, simultaneously increasing the area for the supply of air and the amount of hydrocarbon flow to produce a mixture of greater explosive force, again maintaining the amount of hydrocarbon flow uniform, whereby the piston speed determines the proportions of the mixture in accordance with the increased resistance, and in temporarily retarding the increase in the supply of air to the mixture upon such increase in the area for the air supply.

8. An internal combustion engine comprising a cylinder, a piston reciprocable therein, means, presenting an inlet for the air and an inlet for the hydrocarbon, for supplying the mixture to the cylinder, means for setting the position of the elements which determine the flow of hydrocarbon through the hydrocarbon inlet so as to render said flow uniform at any existing area of the air inlet, and means for adjusting simultaneously the area of the air inlet and the amount of flow of hydrocarbon through the hydrocarbon inlet without disturbing said setting thereby to establish a different but uniform flow of hydrocarbon for each area of air inlet, while allowing the amount of air supplied through the air inlet to be determined by the speed of the piston.

9. An internal combustion engine comprising a cylinder, a piston reciprocable therein, means for supplying a mixture of air and hydrocarbon to the cylinder including an air inlet and a hydrocarbon inlet and acting to maintain a uniform amount of flow of hydrocarbon through the hydrocarbon inlet at each existing area of air inlet to cause a reduction of the proportion of hydrocarbon in the mixture upon each increase of speed of the piston, controlling means acting to vary simultaneously the amount of hydrocarbon flow and the area of the air inlet, and means adjustable at two positions of the controlling means to establish at the said positions the relative proportion of the amount of hydrocarbon flow to area of air inlet, the said means being thus adjustable at the second position without disturbing the proportion established by its adjustment at the first position.

10. An internal combustion engine comprising a cylinder, a piston reciprocable therein, means, presenting an inlet for the air and an inlet for the hydrocarbon, for supplying the mixture to the cylinder, means for setting the position of the elements which determine the flow of hydrocarbon through the hydrocarbon inlet so as to render said flow uniform at any existing area of the air inlet, and means for adjusting the area of the air inlet and the amount of flow of hydrocarbon through the hydrocarbon inlet while maintaining said setting thereby to develop any desired amount of power between the maximum and minimum capacity of the engine and to cause the mixture to become leaner with each increase in the speed of the piston between successive adjustments.

11. An internal combustion engine comprising a cylinder, a piston reciprocable therein, a casing presenting a valve opening leading into a passage leading to the cylinder and a valve opening leading to the atmosphere, an adjustable valve for regulating the area of the former opening, a valve for the latter opening moved by a constant force toward closing position and moved to open position by the suction of the engine, a hydrocarbon supply, a pipe leading from said supply of hydrocarbon to said passage, an adjustable valve for admitting the hydrocarbon from the supply to the pipe, and a conduit connecting the chamber in the casing and the pipe at a point between the hydrocarbon admitting valve and the cylinder whereby variation in the speed of the piston acts to cause variation in the amount of air entering into the mixture delivered to the cylinder, but such variation in the speed of the piston is prevented from varying the flow of hydrocarbon into the mixture for any given position of the hydrocarbon admitting valve.

12. An internal combustion engine comprising a cylinder, a piston reciprocable therein, a casing presenting a valve opening leading into a passage leading to the cylinder and a valve opening leading to the atmosphere, an adjustable valve for regulating the area of the former opening, a valve for the latter opening moved by a constant force toward closing position and moved to open position by the suction of the engine, a hydrocarbon supply, a pipe leading from said supply of hydrocarbon to said passage, an adjustable valve for admitting the hydrocarbon from the supply to the pipe, and a conduit connecting the chamber in the casing and the pipe at a point between the hydrocarbon admitting valve and the cylinder whereby variation in the speed of the piston acts to cause variation in the amount of air entering into the mixture delivered to the cylinder, but such variation in the speed of the piston is prevented from varying the flow of hydrocarbon into the mixture for any given position of the hydrocarbon admitting valve, and means acting upon a demand for an increase in the flow of air to the mixture temporarily to retard said flow.

13. The method of operating an internal combustion engine, comprising a cylinder and a piston reciprocable therein, which consists in overcoming the resistance due to a predetermined range of loads with a mixture of hydrocarbon and air of appropriate quality and uniform density, in overcoming the resistance due to lighter loads with a mixture of less density and of quality determined by the speed of the piston and in varying the amount of flow of the hydrocarbon and the area for the supply of air to cause the proportion of hydrocarbon in the mixture to become less with increase in the speed of the piston at any area for the supply of air.

In testimony whereof, I have signed my name to this specification.

JOSEPH G. PROSSER.